H. NEWBOLD.
EYEGLASS MOUNTING.
APPLICATION FILED SEPT. 6, 1913.
1,145,077.
Patented July 6, 1915.
2 SHEETS—SHEET 1.
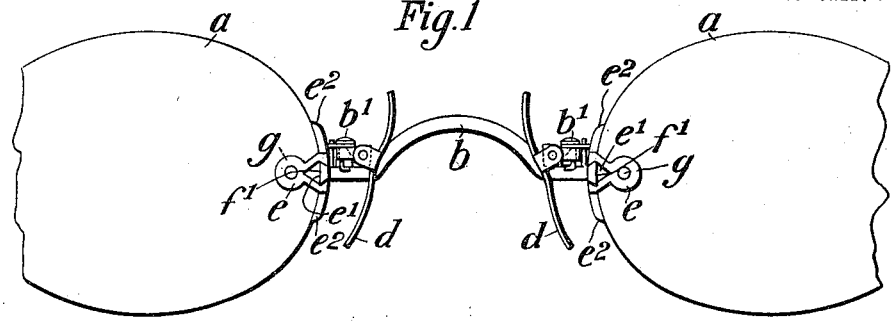
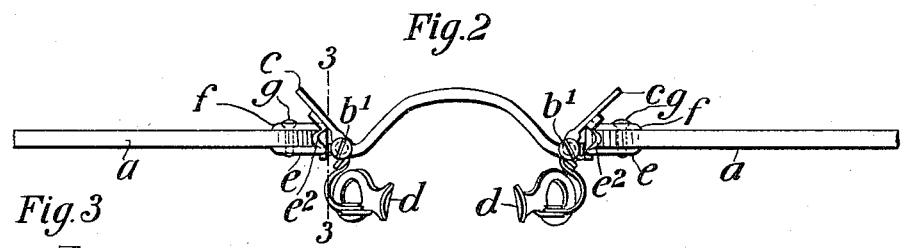
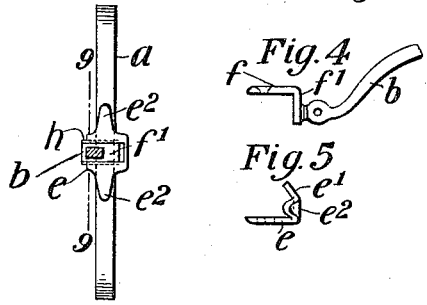
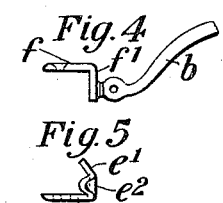
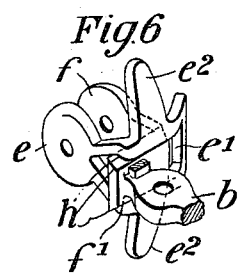
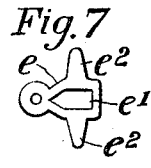
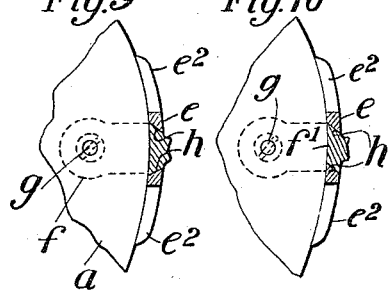
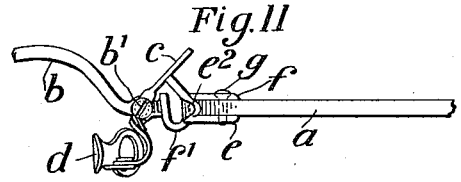
WITNESSES:
Joseph J. Demers
Florence E. Coderre
INVENTOR
HARRY NEWBOLD
By
H. H. Stytt & H. K. Parsons
ATTORNEYS H. NEWBOLD.
EYEGLASS MOUNTING.
APPLICATION FILED SEPT. 6, 1913.
1,145,077.
Patented July 6, 1915.
2 SHEETS—SHEET 2.
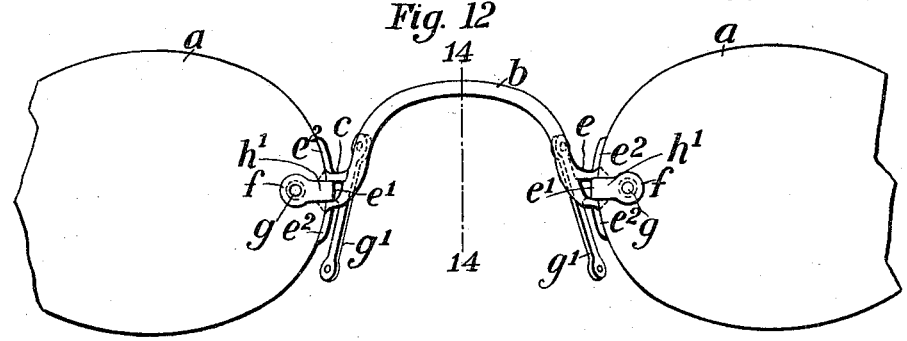
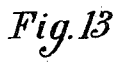
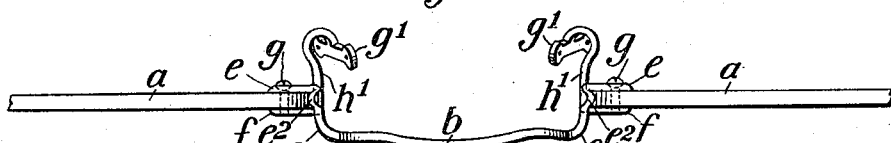
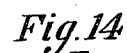
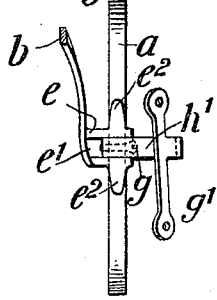
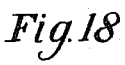
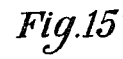
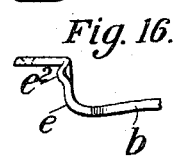
WITNESSES:
INVENTOR
HARRY NEWBOLD
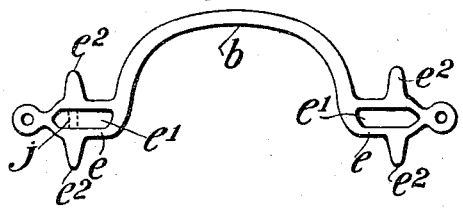
ATTORNEYS

UNITED STATES PATENT OFFICE.

HARRY NEWBOLD, OF ST. ALBANS, ENGLAND.

EYEGLASS-MOUNTING.

1,145,077. Specification of Letters Patent. Patented July 6, 1915.

Application filed September 6, 1913. Serial No. 788,399.

*To all whom it may concern:*

Be it known that I, HARRY NEWBOLD, a subject of the King of Great Britain, residing at St. Albans, in the county of Hertford, England, have invented certain new and useful Improvements in Eyeglass-Mountings, of which the following is a specification.

My invention relates to mounts for rimless eyeglasses and has mainly for its object to provide an improved form of adjustable lens strap or clamp which can be adapted to mounts of different types, and which enables any mount to take lenses of different thicknesses.

According to the invention I provide a lens clamp or strap comprising two bearing pieces or jaws each of which is made so as to bear against one face of the lens and also to embrace the periphery thereof, the portions of the two jaws of each strap or clamp which bear upon the lens periphery also engaging with one another, but in such a manner that the distance apart of the jaws can be adjusted as required.

The improved strap can be utilized in combination with fittings of different types. For example, it can be applied to rimless eyeglasses of the kind known as finger piece eyeglasses, in which case the end of the bridge carrying the post or pivot for the fingerpiece lever is soldered or attached to the end of one of the interlocking jaws of the strap. Or, the improved strap can be adapted to rimless eyeglasses of the kind in which the placquets or guards are opened outward or extended by the horizontal outward bending or turning of the lenses. In this case the complete mount may advantageously be made of three pieces, one piece comprising the bridge and having at each end a portion constituting one jaw or half of the lens strap or clamp, and the other two pieces each consisting of the other half or jaw of the lens clamp or strap and the placquet arm and placquet.

In carrying out the invention one of the parts or jaws of the strap is formed at that part which embraces or bears against the periphery of the lens with a slot, the corresponding part of the other half or jaw of the strap passing through and thus interlocking with the said slotted portion in such a manner that the two parts can be adjusted relatively to one another, so as to take lenses of different thicknesses.

To enable my invention to be fully understood I will describe it by reference to the accompanying drawings, in which:—

Figure 1 is a back view of a pair of rimless eyeglasses of the finger piece type, and provided with adjustable lens straps of the kind above referred to. Fig. 2 is a plan view thereof. Fig. 3 is a section on the line 3—3, Fig. 2. Figs. 4 and 5 are plan views respectively of the two parts or jaws of the strap. Fig. 6 is a perspective view drawn to a larger scale showing the complete strap. Figs. 7 and 8 are views showing the two halves of the strap developed. Fig. 9 is a section on the line 9—9 Fig. 3 drawn to a larger scale. Fig. 10 is a view similar to Fig. 9, but illustrating a modification, and Fig. 11 is a plan view of a portion of a pair of rimless eyeglasses illustrating a slight modification in the strap. Fig. 12 is a view similar to Fig. 1 showing the invention applied to a type of rimless eyeglass in which the placquets are opened out by the horizontal bending of the lenses. Fig. 13 is a plan view thereof. Fig. 14 is a section on the line 14—14, Fig. 12. Fig. 15 is a plan view of one of the placquet stampings. Fig. 16 is a similar view of a portion of the bridge stamping. Fig. 17 is a view of the bridge piece as stamped from the blank and not bent to its final form, and Fig. 18 is a similar view of one of the other placquet stampings.

Referring first to the arrangement illustrated in Figs. 1 to 11 $a$ represents the lenses and $b$ the bridge having the posts or pivots $b'$ carrying the finger piece levers $c$ and placquet $d$, all these parts being of ordinary construction. $e$ and $f$ are the two halves or jaws of each strap which bear respectively against the two opposite faces of the lens $a$ to which they are secured in the ordinary manner by means of a screw $g$ passing through them and the lens. The end of each of these halves or jaws is bent at right angles so as to bear against or embrace the periphery of the lens as clearly shown, this portion of the half or jaw $e$ being slotted as shown at $e'$ and the corresponding portion $f'$ of the other half or jaw $f$ being in the form of a tongue which is designed to pass through and thus interlock with the slotted portion $e'$ of the first named half or jaw. It will thus be seen that while the two portions of the strap are interlocked as stated they can be adjusted relatively to one another to take different thicknesses of lens. The slotted portion $e'$ is formed with lens bearing strap $e^2$ which serves to hold the lens rigidly in the mount.

In the construction illustrated, the end of the bridge $b$, immediately beyond the post or pivot $b'$, is soldered to the tongue $f'$ of the strap half $f$, but it will be obvious that it can equally well be attached to the slotted portion $a'$ of the other strap half.

In practice, to effect a more efficient interlocking of the two parts $e'$ and $f'$ of the two strap halves, I may form the interlocking faces of these two parts with a bevel or with inclined faces $h$ as shown in Fig. 6 and Figs. 9 and 10. My improved lens strap also lends itself when applied to this type of rimless eyeglass to the ready adjustment of the lens to suit different pupillary measurements. For this purpose the end of the strap half to which the bridge is attached— in the case illustrated the end $f'$ of the strap half $f$—can be extended and turned back as shown in Fig. 11 to any desired extent, thus adjusting the position of the center of the lens relatively to the center of the bridge to suit requirements.

Figs. 12 to 18 illustrate the application of my improved lens strap to the form of rimless eyeglass in which the lenses can be turned in a horizontal plane upon a vertical axis, so as to open or extend the placquets, the mount in this case being formed in three pieces inclusive of the lens straps.

$a$ represents the lenses, and $b$ is the bridge portion of a steel stamping, the said bridge $b$ having at each end the part $e$ formed with the slot $e'$ carrying the lens bearing strap $e^2$. Fig. 17 shows this part as stamped from a flat sheet metal blank and Fig. 18 is a similar view of one of two other stampings which consists of the placquets $g'$ and the placquet arm $h'$ to one end of which the placquet $g'$ is attached and the other end of which terminates in the strap half or jaw $f$.

The bridge stamping shown in Fig. 17 is bent in the manner shown in Figs. 12, 13 and 14 and 16, that is to say, the part $e$ having the slot $e'$ is bent round at right-angles to the bridge $b$ and the jaw is then bent at right angles to the slotted part $e'$ so that it comes to lie in a plane parallel to that of the bridge $b$. Each of the other stampings is also bent in a similar way, that is to say, the end of the arm $h'$ having the jaw $f$ is bent round at right angles to the said arm $h'$ and the placquet $g^2$ is turned round upon the said arm to the position shown so that it comes to lie parallel to the side of the wearer's nose.

To fit the mount to a pair of lenses the arms $h'$ of the two placquet stampings are passed through the slots $e'$ of the bridge stamping so that the two jaws $e$ and $f$ at each end of the bridge form the clamps into which the lenses can be inserted and in which they are secured by means of the screws $g$ which pass through holes provided for the purpose in the straps and in the lenses, the parts $e$ and $h'$ of the two stampings which bear against the periphery of the lenses interlocking as clearly shown, so that not only are the lenses securely held in place but the three parts of the mount are connected to form a whole.

In practice the interlocking parts of the lens strap may be made with beveled or inclined edges as described with reference to Figs. 1 to 11. Furthermore, the slotted portion $e'$ of the strap may be formed with a bridge piece $j$, shown in broken lines in Fig. 17, the object of which is to provide an additional means of retaining the interlocking parts in engagement.

Having now particularly described the nature of my said invention and in what manner the same is to be performed, I declare that what I claim is:—

1. An eyeglass mounting consisting of three metal stampings, one stamping comprising the bridge having at each end a half or part of the lens strap which bears against the side of the lens, and has a slotted portion which embraces the periphery of the lenses, and the other two stampings each consist of a placquet and a placquet arm terminating in the other half of the strap which bears against the lens periphery and interlocks with the aforesaid slotted portion.

2. A blank for a lens clip member comprising a jaw portion for engaging one side of a lens and a U-shaped yoke having its ends integral with the jaw portion and having laterally projecting bearing portions for engaging the edge of the lens.

3. A device of the character described comprising a pair of lens engaging jaws separate from each other, and relatively adjustable, one of said members having a continuation bent at right angles thereto to engage the edge of the lens, and the other member having furcations spanning said continuation, and being provided with a loop uniting the furcations to one side of both of the jaws.

4. A device of the character described comprising a pair of members for engaging the edge of a lens, a loop connecting said members at each side to provide a central space therebetween, a lens engaging jaw integral with one of said loops, and a second lens engaging jaw having a portion fitting within the aperture between said edge engaging members.

In testimony whereof I affix my signature in presence of two witnesses.

HARRY NEWBOLD.

Witnesses:
JAMES P. PETHERICK,
O. J. WORTH.

Copies of this patent may be obtained for five cents each, by addressing the "Commissioner of Patents, Washington, D. C."